Sept. 17, 1963  G. W. KING  3,104,274
SAFETY ATTACHMENT FOR REAR VIEW VEHICLE MIRRORS
Filed March 5, 1963  3 Sheets-Sheet 1

INVENTOR.
GARNER W. KING
BY
Huebner & Worrel
ATTORNEY:

Sept. 17, 1963  G. W. KING  3,104,274
SAFETY ATTACHMENT FOR REAR VIEW VEHICLE MIRRORS
Filed March 5, 1963  3 Sheets-Sheet 2
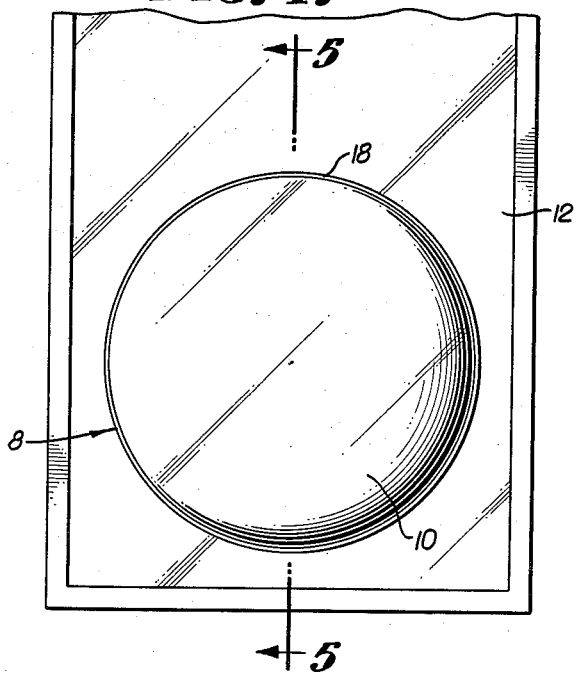
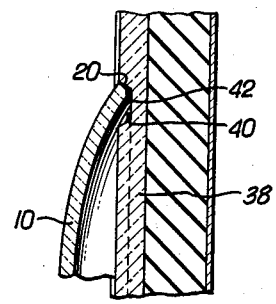
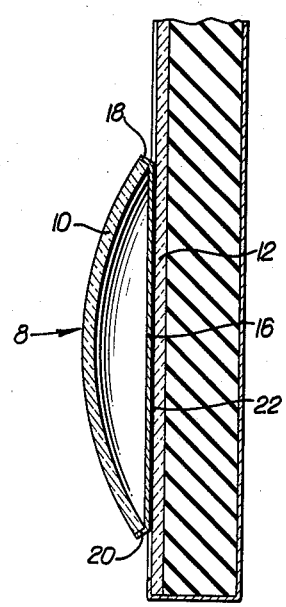
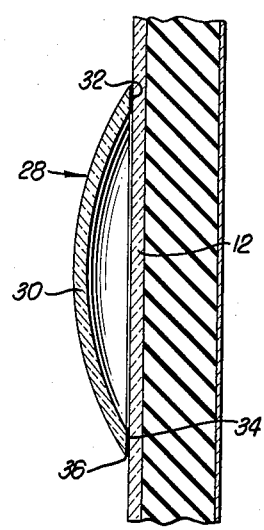
INVENTOR.
GARNER W. KING
BY
Huebner & Worrel
ATTORNEYS.

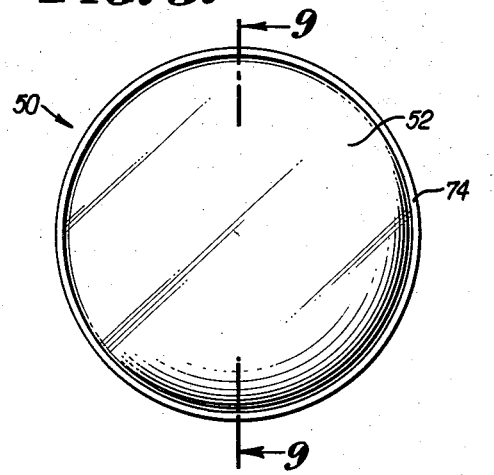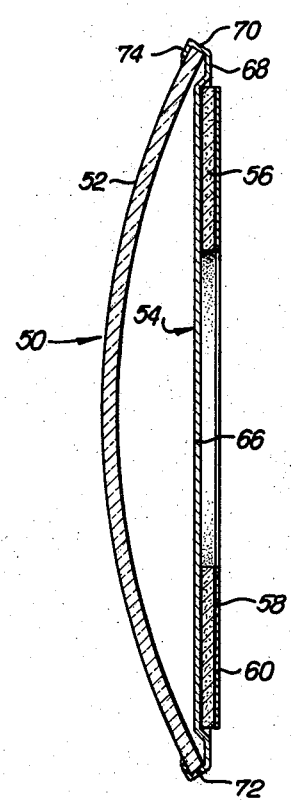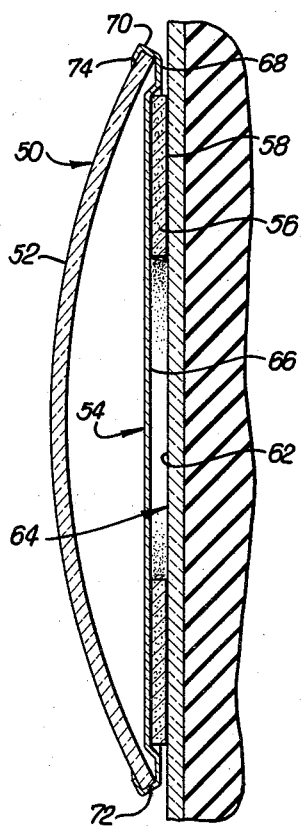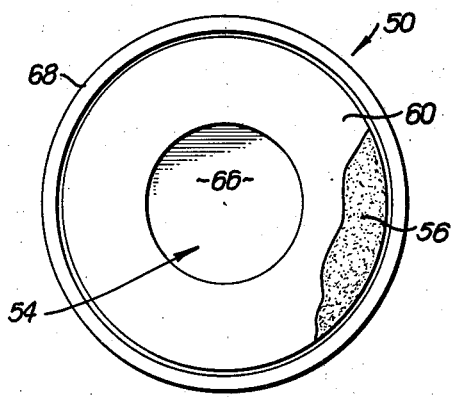

United States Patent Office 3,104,274
Patented Sept. 17, 1963

3,104,274
SAFETY ATTACHMENT FOR REAR VIEW
VEHICLE MIRRORS
Garner W. King, 15609 Van Buren, Gardena, Calif.
Filed Mar. 5, 1963, Ser. No. 263,384
3 Claims. (Cl. 88—87)

This is a continuation-in-part of my copending application for Safety Attachment for Rear View Vehicle Mirrors, Serial No. 163,465, filed January 2, 1962, now abandoned.

The present invention relates to rear view vehicle mirrors and more particularly to a mirror having generally a convex configuration, which is adapted to be applied to a presently existing flat rear view vehicle mirror to provide a mirror combination which simultaneously affords undistorted rear view vision of limited angular scope and wide angle rear view vision.

It is an object of the present invention to provide a generally convex mirror which is adapted to be fixedly secured to the planar front face of a presently existing flat rear view vehicle mirror to enlarge the rear view field of vision so that a sufficiently large portion of the road may be viewed in order to avoid hazards which may develop from the approaching and passing vehicle and further to obtain an adequately enlarged field of vision so that passing of another vehicle and turning corners may be accomplished with a maximum degree of safety.

Another object is to provide a convex mirror attachment for a flat rear view mirror which, when attached, produces a combination mirror arrangement having the combined advantages of undistorted rear vision with accurate depth perception in the flat part, and increased field of vision in the convex part, so that a vehicle operator can more readily avoid hazards to the rear and close to the side of the vehicle while the vehicle is traveling either forwardly or in reverse, and so that the operator can even see obstructions which might be in the path of the wheels of the vehicle when the vehicle is being backed up.

A further object of this invention is to provide a convex mirror of the character described wherein the mirror has applied to the back side thereof a pressure sensitive adhesive which facilitates the application and removal of the convex mirror to the flat vehicle mirror and which provides a feature whereby the operator of the vehicle may apply the concavo-convex mirror to the flat mirror in a position of his choice; this attachment of the convex mirror to the flat mirror by adhesive bonding completely eliminating the need of separate mounting brackets for the convex mirror which would otherwise add to the expense of the installation, reduce the stability of mounting and add impediments to visibility at the sides of the vehicle.

A yet further object of this invention is to provide a convex mirror of the character described wherein tenacity of adherence of the mirror to the flat vehicle mirror is enhanced by a flat adhesive covered back which is affixed to the back of the concavo-convex mirror.

A more specific object of this invention is to provide a convex rear view mirror of the character described wherein the radius of curvature and diameter of the mirror are such that vision to the rear is not unduly distorted and the reflection of objects to the rear is sufficiently large so that relatively instant recognition is obtained as to the identity, nature and number of the objects.

A still more specific object of this invention is to provide a mirror of the character described wherein the convex mirror is applied to the side mirrors located outside the vehicle, and particularly to the right-hand side mirror, and in so applying the convex mirror the horizontal and vertical field of vision of the vehicle operator is enlarged so that the usual blind spots along the sides and immediately to the rear of the vehicle which are not visible in the flat mirrors are eliminated, enabling the driver to see the wheels on the right-hand side of the vehicle, and affording a substantial reduction in certain types of accidents, such as running over pedestrians or children or bicycles or tricycles, squeeze and sideswipe accidents involving small vehicles, driving over curbs or other objects when making right turns, and other similar accidents.

An additional object is to provide a novel combination of a flat rear view vehicle mirror and a convex rear view mirror wherein the convex mirror is rigidly bonded to the exposed planar face of the flat mirror so as to position the convex mirror in an optimum exposed viewing position immediately forward of the forwardmost surface of the flat mirror, and so as to provide the convex reflecting surface with the same mounting stability as the flat mirror, with the convex and flat mirror reflecting surfaces supported in the same relative positions regardless of changes in position of the flat mirror on its supporting structure.

Further objects and advantages of this invention will appear during the course of the following part of this specification wherein the details of construction and mode of operation of a first and a second embodiment are described with reference to the accompanying drawings, in which:

FIG. 4 is a fragmentary front elevation view showing one form of the present invention applied to a flat vehicle rear view mirror;

FIG. 5 is a vertical sectional view taken on line 5—5 of FIG. 4;

FIG. 6 is a vertical sectional view similar to FIG. 5, but illustrating a second form of the invention;

FIG. 7 is a fragmentary section illustrating a third form of the invention;

FIG. 8 is a front elevation view showing a fourth form of the convex mirror structure of the present invention;

FIG. 9 is a vertical sectional view taken on line 9—9 of FIG. 8;

FIG. 10 is a fragmentary vertical section showing the convex mirror structure of FIGS. 8 and 9 affixed to a flat vehicle rear view mirror; and FIG. 11 is a rear elevation view of the form of convex mirror structure shown in FIGS. 8, 9 and 10.

Figure 1:
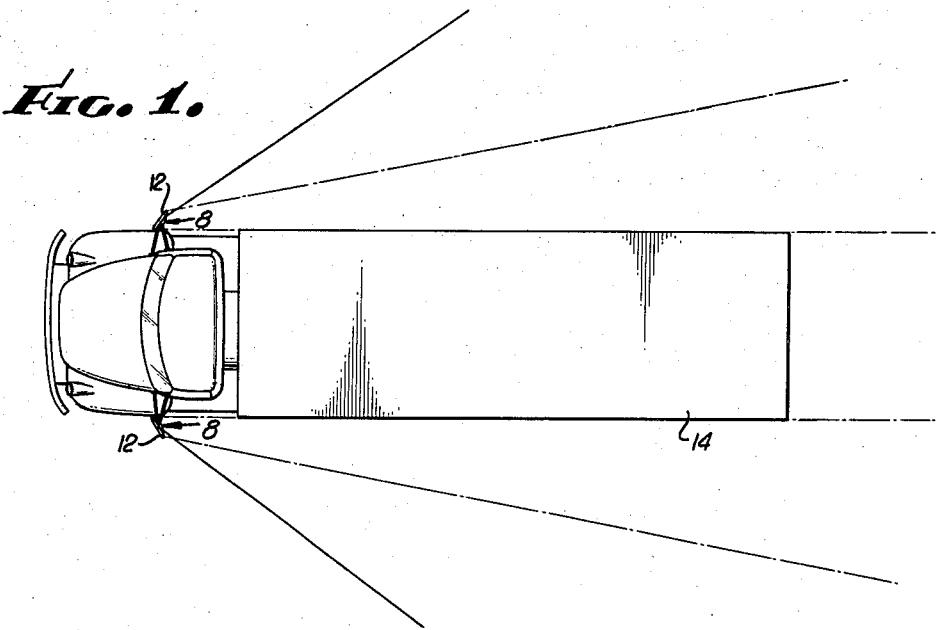
FIG. 1 is a top plan view of a truck having the present invention installed on the exterior side mirrors thereof, and illustrating the relatively restricted horizontal rear view field of vision obtained with the flat vehicle mirror defined by the dotted lines and the enlarged, horizontal rear view field of vision provided by the present invention as defined by the solid lines.

Referring initially to FIGS. 4 and 5 of the drawings wherein may be seen one form of a circular rear view vehicle mirror 8 having a concavo-convex body 10 which is applied to an exteriorly-located flat, rear view mirror 12 of a truck, bus, automobile or other vehicle 14. Preferably, the mirror 8 is removably applied to mirror 12. In order to achieve rapid identification of objects as viewed in the mirror 8, it is preferred that the mirror body 10 have a radius of curvature between about 4 inches to 7 inches and optimum identification of objects is achieved when the body has a radius of curvature of about 5 inches. With the mirror body 10 having a radius of curvature of about 4 inches, a 3-foot object can be readily and rapidly identified 100 feet to the rear of the vehicle. If the curvature is too flat, or the radius of curvature is too great, the operator of the vehicle is deceived into believing that distances can be accurately judged when in reality they cannot. Within the dimensions given the radius of curvature of the mirror body 10 depends on the size of the flat vehicle mirror 12 to which the concavo-convex mirror is applied.

It is further preferred that the diameter of the mirror body 10 be between about 2 inches to 4 inches. The diameter of the mirror body 10 depends on the size of the flat vehicle mirror 12 to which it is applied. For example, for a flat, round vehicle mirror having a diameter of 4 inches, a mirror 8 applied thereto which has about a 2-inch diameter will be satisfactory. If the flat vehicle mirror 12 has dimensions between 3 inches to 4 inches wide and 4 inches to 8 inches high, a suitable mirror 8 may have a diameter of about 3 inches. On the other hand, if the flat vehicle mirror 12 has a width between 4 inches to 5 inches and a height of about 16 inches, then a concavo-convex mirror 8 having a diameter of about 4 inches will be suitable.

In the form of the invention shown in FIGS. 4 and 5 a flat back 16 is applied to the mirror body 10 as best seen in FIG. 5. The application of the flat back 16 to the mirror body 10, in effect, converts the mirror body from a concavo-convex configuration to a planar-convex configuration. The back 16 has a circular configuration defined by an outwardly flared annular flange 18 which encircles the mirror body 10 and is in full contacting engagement with the circumferential edge 20 thereof. Affixing of the back 16 to the mirror body 10 is achieved by applying an adhesive either to the circumferential edge 20 or to the flange 18, and it is preferred that the adhesive be weather resistant and particularly moisture or water resistant.

To achieve the affixing of the mirror 8 to the existing vehicle mirror 12, which in many instances will already be mounted on a vehicle, it is preferred that a pressure sensitive adhesive 22 be employed, and this may be distributed over the entire exterior surface of the back 16, and in this manner a firm face-to-face bonding between back 16 and mirror 12 is accomplished. By using a suitable pressure sensitive type of adhesive, the attachment of mirror 8 to the face of mirror 12 may be releasable for removability of the mirror 8 from the mirror 12 for moving the mirror 8 to a more desirable position on the face of mirror 12, or to replace mirror 8.

Although the mirror body 10 may be fabricated of any suitable material having a mirror finish, such as brightly polished metals, or plastics which have applied thereto a substance to produce a mirror surface, it is preferred that the mirror body 10 be fabricated of glass which has been "silvered" to produce the desired mirror surface. The back 16 also may be fabricated of many materials, but metal, such as aluminum, is preferred.

Figure 3:
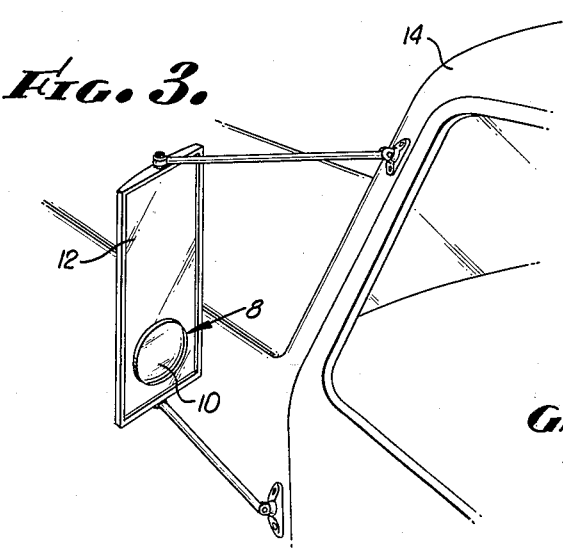
FIG. 3 is a perspective view illustrating the present invention applied to a flat exterior rear view vehicle mirror.

Referring now to FIG. 3 wherein it may be seen that the mirror 8 is applied to the lower portion of vehicle mirror 12, positioning of mirror 8 on the vehicle mirror 12 is entirely optional with the vehicle operator, but it has been found that the position illustrated in FIG. 3 is preferred. However, the pressure sensitive adhesive 22 which imparts the property of being able to remove mirror 8 from mirror 12 at the discretion of the vehicle operator, provides the operator the opportunity of selecting, by trial and error, the position most desirable from his view point.

Figure 2:
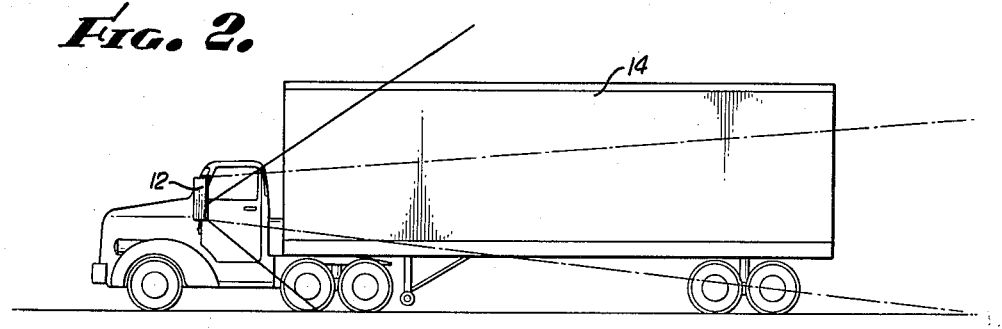
FIG. 2 is a side view of a truck having the present invention installed on the exterior side mirrors thereof and again providing a comparison between the vertical field of vision obtained with a flat mirror again identified by dotted lines, and the enlarged field of vision achieved with the present invention, identified by solid lines.

FIGS. 1 and 2 serve to illustrate the advantages achieved by applying mirror 8 to mirror 12. In FIG. 1, which is an overhead or an aerial view of a truck, the dotted lines define the limited horizontal rear view field of vision achieved with the flat vehicle mirror 12; whereas the solid lines in FIG. 1 illustrate that mirror 8 considerably enlarges the horizontal field of vision to the rear and side to afford a more accurate and complete determination of road conditions.

The enlarged horizontal rear view field of vision achieved with mirror 8, as illustrated in FIG. 1, provides the vehicle operator with the opportunity of quickly and accurately ascertaining the conditions adjacent the side of the vehicle with respect to vehicles approaching and passing wide from the rear; whereas the flat vehicle mirror 12 fails to provide this information. In other words, mirror 8 would eliminate certain "blind areas" which heretofore were present. Therefore, the flat mirror 12 in combination with the convex mirror 8 provides the vehicle operator with a greatly extended horizontal rear view field of vision.

FIG. 2 is a side view of a truck which serves to illustrate by representative dotted and solid lines the vertical rear view field of vision achieved with the flat vehicle mirror 12 and the convex mirror 8, respectively, the latter not being seen in FIG. 2, due to the position of the mirror 12. It may be seen that the vehicle operator can only see as low as the tops of the rear trailer wheels when mirror 12 is used and the top of the truck cannot be seen at all. But mirror 8 enlarges this vertical field of vision to such an extent that the operator can see the rear wheels of the tractor portion of the truck and the top of the truck adjacent the cab. This enlarged vertical rear view field of vision is of great benefit to vehicle operators because it removes critical "blind spots" to such an extent that compact automobiles and the like can be more readily seen. Of particular importance, with the present invention the operator is able to see pedestrians or children on bicycles and tricycles near the right-hand rear tractor and trailer wheels, and is also able to see curbs, fire hydrants and the like at the right-hand side of the vehicle.

FIG. 6 illustrates a second form of a circular rear view vehicle mirror 28 having a concavo-convex body 30 which may be removably applied to a flat vehicle mirror 12. The body includes a flat annular surface 32 which is perpendicular to the axis of said body. When preferably a pressure sensitive adhesive 34 is applied to surface 32 and the body 30 is removably affixed to flat vehicle mirror 12, a reliable face-to-face bond will be achieved between surface 32 and the vehicle mirror 12. With body 30 shaped in the manner defined, the peripheral edge 36 thereof blends or tapers into the mirror 12.

In all other respects mirror 30 is substantially identical to mirror 8 and produces substantially identical results.

FIG. 7 shows a third form of the invention wherein the mirror body 10 is attached to a flat rear view mirror 38 by providing a circular recess 40 in the face of mirror 38, and seating the circumferential edge 20 of mirror body 10 therein, with a suitable bonding material being distributed about the edge 20. The circular recess 40 has an outwardly flaring outer defining edge 42 that is complementary to and slightly larger than the circumferential edge 20 of mirror body 10, and preferably the mirror body 10 is composed of substantially thinner glass than the mirror 38 so that the circumferential edge 20 can be completely recessed within the circular recess 40 so that the surface of mirror body 10 blends smoothly into the surface of mirror 38. Although the circular recess 40 is shown in FIG. 7 as a circular channel, it is to be understood that the recess 20 could be enlarged to include the entire area circumscribed by the outer edge 42.

Although it is preferred to employ a pressure sensitive type of adhesive to secure mirror 8 or mirror 28 to the flat existing vehicle mirror 12, it is to be understood that any other suitable bonding material may be employed within the scope of the invention.

FIGS. 8–11 illustrate a further form of the convex rear view vehicle mirror unit 50 which comprises a circular concavo-convex body 52, a generally flat sheet metal backing 54, a resilient foam plastic cushioning sheet 56 bonded to the rear surface of the metal backing 54, and a layer 58 of pressure sensitive adhesive on the rear surface of the cushioning sheet. A paper covering sheet 60 is provided over the adhesive layer 58 as shown in FIG. 9 prior to mounting of the mirror unit 50 on a flat mirror, but this sheet 60 is peeled off for pressure adhesion of the mirror unit 50 onto the exposed or front planar surface 62 of a flat rear view vehicle mirror 64 as shown in FIG. 10. When the convex mirror unit 50 is adhesively secured to the flat mirror 64, the central axis of the convex mirror will be normal to the flat mirror, whereby the enlarged field of vision of the convex mirror unit will completely overlap the field of vision of the flat mirror.

The sheet metal backing 54 is preferably made of a light-weight metal such as aluminum which is readily formed and has good weather resisting qualities. Other suitable material may, of course, be used. As best seen in FIGS. 9 and 10, the backing 54 has a flat, disc-shaped central portion 66 occupying most of the rear portion of the mirror unit 50, with a narrow, flat annular peripheral portion 68 that is parallel and slightly rearwardly offset with respect to the central portion 66. At the outer edge of the peripheral portion 68 the backing is formed forwardly in a peripheral flange 70. This flange 70 encompasses and extends forwardly of the peripheral edge 72 of the body 52 of the mirror, and its outer edge is spun or crimped over in front of the periphery of the convex forward face of body 52 in a retaining lip 74. By this means, the backing 54 and body 52 are permanently secured together, with the generally irregular and often sharp-cornered peripheral edge 72 of the mirror body 52 completely encompassed by the wrap-around type periphery of the backing 54.

While the backing 54 with the retaining lip 74 spun or crimped directly over the periphery of the forward surface of body 52 is preferred, an alternative construction can be employed, if desired, wherein the lip is slightly larger in diameter than the peripheral edge 72 of the body, and the body is retained in the lip by means of a snap ring.

There are several important advantages to wraparound type backing 54 shown in FIGS. 8–11, in addition to its economy and simplicity. One advantage is that by recessing the flat, central portion 66 of the backing, the foam plastic cushioning sheet 56 may be employed, while the mirror unit 50 may still be mounted very close to the exposed forward surface 62 of the flat mirror 64. The cushioning layer 56 is helpful in obtaining a full-surface bond of the pressure sensitive adhesive layer 58 against the flat mirror surface 62, and it will distort sufficiently to accommodate any slight irregularities between the opposed surfaces of the backing 54 and flat mirror surface 62.

The wrap-around type backing 54 has a further, unobvious advantage in the application of the convex mirror unit 50 to a flat mirror surface. Thus, the turned-in flanged edge, while securely holding the body 52 therein, nevertheless permits a gradual equalization of the air pressure within the mirror unit and the external atmospheric pressure, whereby the flat back portion 66 will not tend to bow outwardly as the vehicle climbs from one elevation to a higher one. This can be a serious problem with a fully bonded connection between the body and the metal backing.

The sheet metal backing of the mirror unit 50 shown in FIGS. 8–11 has the further advantage of sealing the periphery of the body 52 sufficiently against the weather so that the mirror finish on the concave side of the body 52 will not tend to flake off. Also, this metal backing only touches the body 52 at the periphery thereof, so that it does not come into contact with the mirror coating on the concave surface of the body 52 and will not damage the mirror coating by chemical action, abrasion or otherwise.

It will be noted from FIGS. 9, 10 and 11 that the foam plastic cushioning sheet 56 and pressure sensitive adhesive layer 58 are in the shape of a flat ring. This will normally provide adequate bonding area for good adhesion to the flat mirror, although a full disc foam sheet and adhesive layer may be employed, if desired.

It is to be understood that the entire back surface of the metal backing may be made in one plane, if desired, without having a recessed central portion of the backing, and in such case the foam cushioning may be employed if desired, or it may be eliminated, with the pressure sensitive adhesive layer being applied directly to the metal backing in the manner shown in FIG. 5 of the drawings.

While the instant invention has been shown and described herein in what are conceived to be the most practical and preferred embodiments, it is recognized that departures may be made therefrom within the scope of the invention, which is therefore not to be limited to the details disclosed herein, but is to be accorded the full scope of the claims as to embrace any and all equivalent devices.

What I claim is:

1. A safety mirror device comprising in combination a flat rear view vehicle mirror comprising an exposed continuous flat front viewing surface, a convex mirror unit including a circular concavo-convex mirror body having a convex reflecting surface and also including a generally flat circular sheet metal backing covering the back portion of said body, said sheet metal member being peripherally attached to said body, said attachment being air permeable to permit pressure equalization between the concavity within said convex mirror unit and the atmosphere externally of said convex mirror unit, a thin annular sheet of cushioning material affixed to the rear surface of said backing and covering at least a substantial area thereof, and an adhesive material applied to the rear surface of said annular sheet for securing said annular sheet to said flat front surface of the vehicle mirror in full contacting engagement so as to rigidly secure said convex mirror unit to said vehicle mirror with said convex reflecting surface disposed in fixed position in front of said flat front surface of said vehicle mirror, the portion of said vehicle mirror not covered by said convex mirror unit affording a vehicle operator an undistorted rear view field of vision, and said convex mirror unit affording the operator a field of vision which overlaps said vehicle mirror field of vision but is materially larger both horizontally and vertically.

2. The device of claim 1 wherein said annular sheet of cushioning material is substantially entirely recessed in a depressed central portion which comprises substantially the entire rear surface of said sheet metal backing.

3. The device of claim 1 which includes a forwardly extending peripheral flange extending from said sheet to surround the periphery of said body, said peripheral flange including an inturned outer lip portion extending across the peripheral edge of the front surface of said body to secure said body to said backing.

References Cited in the file of this patent

UNITED STATES PATENTS

| | | |
|---|---|---|
| 1,114,559 | Weed | Oct. 20, 1914 |
| 1,521,508 | Denoux | Dec. 30, 1924 |
| 1,622,157 | Law | Mar. 22, 1927 |
| 1,771,061 | Rice | July 22, 1930 |
| 1,777,435 | Hogelund | Oct. 7, 1930 |
| 2,267,542 | Walz | Dec. 23, 1941 |
| 2,432,928 | Palmquist | Dec. 16, 1947 |
| 2,698,595 | Morgan | Jan. 4, 1955 |

FOREIGN PATENTS

| | | |
|---|---|---|
| 827,336 | Great Britain | Feb. 3, 1960 |